No. 688,399. Patented Dec. 10, 1901.
W. F. ELLIS & E. C. DAVIS.
VEHICLE WHEEL.
(Application filed Feb. 15, 1901.)
(No Model.)
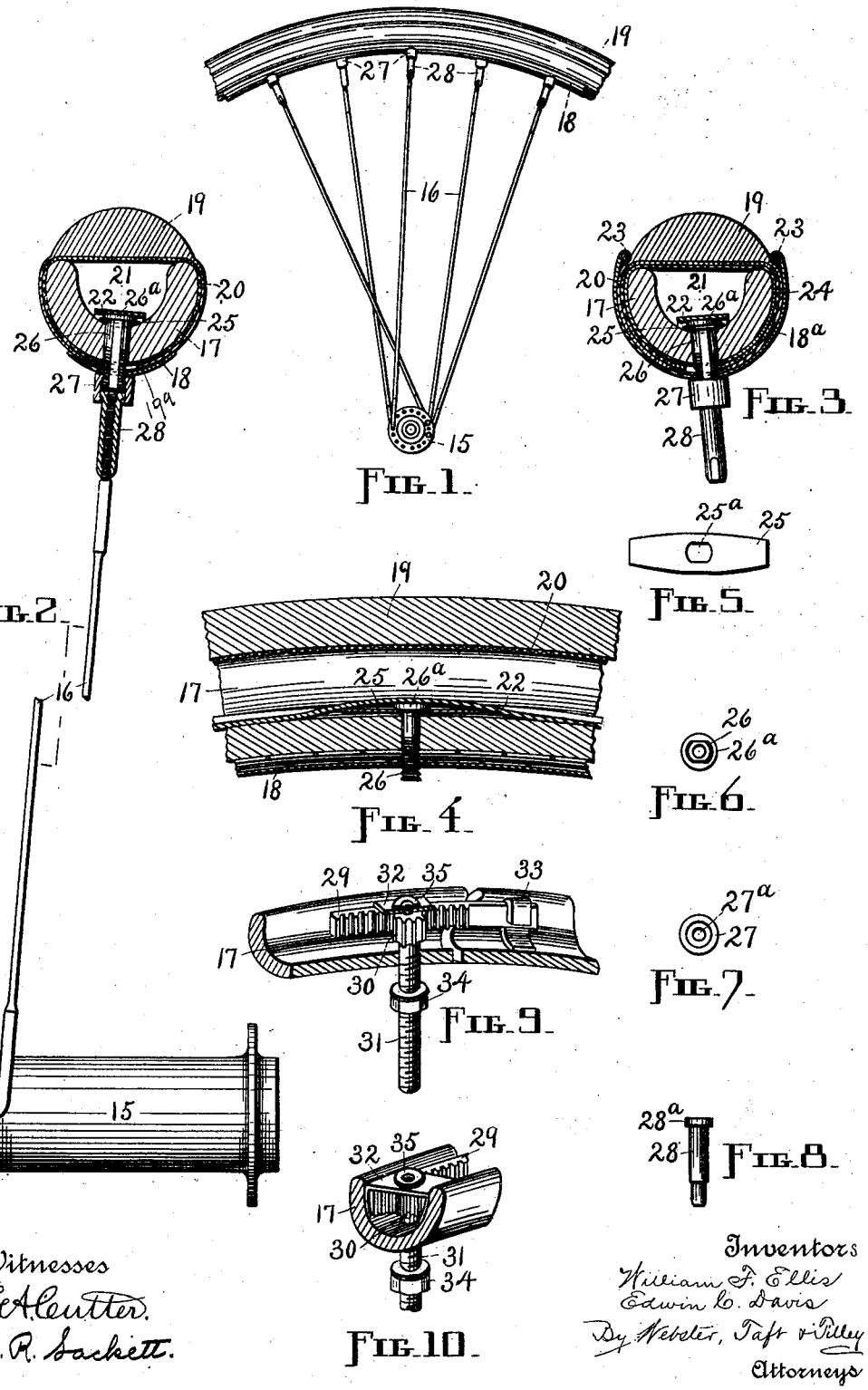

UNITED STATES PATENT OFFICE.

WILLIAM F. ELLIS AND EDWIN C. DAVIS, OF SPRINGFIELD, MASSACHUSETTS, ASSIGNORS TO THE DAVIS TIRE COMPANY, OF SPRINGFIELD, MASSACHUSETTS, A CORPORATION OF MAINE.

VEHICLE-WHEEL.

SPECIFICATION forming part of Letters Patent No. 688,399, dated December 10, 1901.

Application filed February 15, 1901. Serial No. 47,434. (No model.)

*To all whom it may concern:*

Be it known that we, WILLIAM F. ELLIS and EDWIN C. DAVIS, citizens of the United States, and residents of Springfield, in the county of Hampden and State of Massachusetts, have invented a new and useful Vehicle-Wheel, of which the following is a specification.

Our invention relates to improvements in wheels for bicycles, motor and other carriages, and the like, in which a practically inflexible channeled rim supporting a yielding tire either with or without a leather rim-covering interposed between the two is provided with a shield held in place by certain fastenings peculiarly adapted for the purpose both of securing said shield and the spokes and also provided with a tightening device; and the objects of our improvement are, first, to furnish a wheel with easily-manipulated fastenings for the spokes, whereby they can be readily and quickly assembled and replaced when broken, said fastenings also serving to bind the shield firmly to the rim for the protection of the interposed soft or yielding parts and to conceal the joint formed by said parts or the laced edges thereof; second, to provide means for drawing together the ends of the rim after it has been sprung onto the shield or other concentric member, thus rendering the parts circumferentially tight, and, third, to produce a strong and durable wheel that is serviceable in every particular, rigid in construction, and free from rattling or undue vibration. We attain these objects by the mechanism illustrated in the accompanying drawings, in which—

Figure 1 is a reduced side view of a section of our wheel; Fig. 2, a full-size cross-section of the rim and tire, showing our spoke-fastening attached to said rim and a spoke in position, the fastening being in partial section; Fig. 3, a cross-section of the rim and tire, showing a leather cover and an extended shield; Fig. 4, a longitudinal section of a portion of the rim and tire with certain of the fastening devices and attached members in place; Fig. 5, a plan view of the tire-fastening washer; Fig. 6, a bottom view of the tire-fastening socket; Fig. 7, a top view of the fastening-collar; Fig. 8, a side view of the fastening-sleeve; Fig. 9, a perspective view of the tightening device, showing it attached to sections of a rim; and Fig. 10, also a perspective view of said device, but exhibiting more of an end view of the same.

Similar characters refer to similar parts throughout the several views.

Our wheel consists in the main of the hub 15, the spokes 16, connecting the channeled rim 17 with said hub, the shield 18, the tire 19, and certain fastening and tightening devices, all of which will now be described in detail. The hub 15 may be of any ordinary construction, and the spokes 16 have common shouldered heads to engage with said hub and threaded ends adjacent to the rim 17. Said rim preferably consists of wood convex toward the hub 15 and has a concave periphery, the outer edges being rounded over. The rubber tire 19 is made up with a solid peripheral portion and thin side flaps to embrace the rim 15, a lining 20 of heavy fabric, as "duck," being attached on the inside of said tire, and consequently contiguous with said rim. The presence of this lining is not imperative, however. The construction above described leaves the annular chamber 21 between the rim and tire, and the elastic band 22 appears in said chamber stretching around said rim. The band preferably consists of a single continuous piece, but may be introduced in sections provided all of the spoke-fastenings are covered. The edges of the flaps of the tire 19 and the lining 20 are laced at 19ª and said lining cemented to said tire, and we cover the joint so formed with the metallic shield 18, which serves to protect the rubber parts adjacent to the spoke-fastenings, as well as to conceal the aforesaid lacing and joint.

For heavy vehicle-wheels the shield 18ª may be employed, which is simply an extended form of the shield 18, having the wires 23 23 embraced by its overturned edges, said wires being located at the junction of the solid portion of the tire 19 with its flaps. The shield 18ª protects the thin portions of the tire, and the wires 23, located as specified, materially strengthen said tire and add to its durability. Furthermore, it has been found desirable in wheels of this class to add the leather covering 24, which is shrunk onto the rim 17, the lining 20 being outside of the same. The covering 24 can be used, of course, with either the shield 18 or 18ª, and it is obvious that more than one leather covering may be employed—that is, a second one can be placed over the first.

The spoke-fastening consists of the elongated washer 25, having a hole 25ª, through which the exteriorly-threaded socket 26 passes, the collar 27, interiorly threaded to engage said socket, and the sleeve 28, interiorly threaded to engage the threaded end of a spoke 16. Two sides of the socket 26 are flattened to correspond with the straight edges of the elongated hole 25ª in the washer 25, so that said socket cannot turn in said washer. The socket is provided with a head 26ª, which bears on the washer beneath the band 22, the body of said socket passing through suitable holes in the rim and shield to receive the collar 27. The tightening of the collar on the socket, which secures the shield firmly in place, is made possible of accomplishment by the inability of said socket to turn, owing to the fact that the washer now forced against the rim lies along the channel therein and cannot itself be turned.

The collar 27 has a shouldered base 27ª to receive the sleeve-head 28ª, said sleeve turning freely in said collar. In order to remove a broken spoke, for example, unscrew the threaded end from the sleeve and remove the other end from the hub, then insert a new spoke in the hub, remove the collar and attached sleeve from the socket, push the latter into the chamber 21 against the resiliency of the band 22 after attaching the sleeve to the new spoke, swing the collar into place beneath the socket, which the band now presses into the collar, and screw the latter tight against the shield again, the sleeve being once more turned, if necessary, for final adjustment of the parts. The socket and collar are preferably provided with left-hand threads and the sleeve with right-hand threads. The socket is pierced longitudinally, and its base necessarily clears the head of the sleeve in the collar when the latter is screwed up.

In order to draw the severed ends of the rim 17 together and tighten the same, we provide the rack 29 and pinion 30, fast on the end of the spindle 31, one terminal of said rack playing through the bridge 32, fast to the inside walls of said rim at one side of the break therein, and the opposite terminal secured to the lug 33, fast to one of the inside walls of said rim the other side of said break. The spindle 31 extends through the center of the rim and is threaded to receive the set-nut 34. After tightening the rim through the medium of the rack and pinion the set-nut is firmly seated to prevent the turning of the spindle in the direction opposite to that required to actuate the rack or for the loosening of said rim. The head of the spindle 31 is upset beyond the bridge 32 and the washer 35 interposed between said upset head and bridge for the purpose of holding said spindle in position and to facilitate turning the same.

Any suitable resilient means may be substituted for the elastic band 22 to press on the socket 26.

We are aware that other spoke-fastening and rim-tightening devices have been applied to vehicle-wheels before and do not seek to claim such devices broadly; but What we do claim as our invention, and desire to secure by Letters Patent, is—

1. The combination, in a vehicle-wheel, of a substantially inflexible rim, a concentric interior shield of the same general contour as the adjacent surface of said rim, and a tire secured directly to said rim by infolding flaps introduced between the same and said shield, substantially as set forth.

2. The combination, in a vehicle-wheel, of a substantially inflexible rim, a concentric interior shield of the same general contour as the adjacent surface of said rim, a tire secured directly to said rim by infolding flaps introduced between the same and said shield, and stiffening means at the edges of said shield, contiguous with said tire at the junction of the flaps and solid portion thereof, substantially as set forth.

3. The combination, in a vehicle-wheel, of a substantially inflexible rim, a tire secured thereto by flaps, a shield adapted to cover and protect said flaps, a threaded member piercing said rim and shield, and a collar adapted to engage said member and force said shield against said flaps, substantially as set forth.

4. The combination, in a vehicle-wheel, of a channeled rim covered with leather, a flexible tire secured thereto by flaps, and a shield adapted to cover and protect said flaps, substantially as set forth.

5. The combination, in a vehicle-wheel, of a channeled rim covered with leather, a flexible tire secured thereto by flaps, and a shield adapted to cover and protect said flaps, said shield having reinforced edges contiguous with said tire at the junction of the flaps and solid portion, substantially as set forth.

6. In combination, a channeled rim, a flexible tire secured thereto by flaps, and a shield held in place about said flaps by a spoke-fastening comprising a non-rotary socket extending through said rim, a collar threaded thereto, and a threaded spoke-sleeve loosely held by said collar, substantially as set forth.

7. In combination with a vehicle-wheel having a channeled rim, a spoke-fastening comprising a non-rotary socket extending through said rim, resilient means in the rim-channel to normally thrust the base of said socket beyond the rim exterior, a collar threaded to said socket, and a threaded spoke-sleeve loosely held by said collar, substantially as set forth.

8. In combination with a vehicle-wheel having a channeled rim, a spoke-fastening consisting of a socket extending through said rim and flattened, an elongated washer in the rim-channel having a hole adapted to receive a flattened part of said socket whereby the latter is prevented from turning, a collar threaded to said socket, and a threaded spoke-sleeve loosely held by said collar, substantially as set forth.

9. In combination with a vehicle-wheel having a channeled rim, a spoke-fastening consisting of a socket extending through said rim and flattened, an elongated washer in the rim-channel having a hole adapted to receive a flattened part of said socket whereby the latter is prevented from turning, resilient means in said channel to normally thrust the base of said socket beyond the rim exterior, a collar threaded to said socket, and a threaded spoke-sleeve loosely held by said collar, substantially as set forth.

10. In combination, a channeled vehicle-wheel rim, a flexible tire secured thereto by flaps, a shield held in place about said flaps by spoke-fastenings comprising a socket in the rim, a collar threaded to said socket outside of said rim and a spoke-sleeve loosely held by said collar, means in the rim-channel to prevent said socket from turning, and means in said channel to normally thrust the base of the socket beyond the rim exterior, substantially as set forth.

11. In combination with a vehicle-wheel having a severed channeled rim, a rack secured in the rim-channel at one side and extending across the break being rigidly attached to one of the separated terminals, a pinion meshing with said rack, and means to rotate and hold said pinion, substantially as set forth.

12. In combination with a vehicle-wheel having a severed channeled rim, a rack secured in the rim-channel at one side and extending across the break being rigidly attached to one of the separated terminals, a spindle bearing in said rim and an internal member and provided with a pinion meshing with said rack, and a set-nut threaded to said spindle, substantially as set forth.

In testimony whereof we have signed our names in the presence of two subscribing witnesses.

WILLIAM F. ELLIS.
    EDWIN C. DAVIS.

Witnesses:
 DEXTER E. TILLEY,
 J. R. SACKETT.